(12) United States Patent
Kumar et al.

(10) Patent No.: US 9,312,686 B2
(45) Date of Patent: Apr. 12, 2016

(54) HIGH VOLTAGE PROTECTION CIRCUIT FOR NON-TOLERANT INTEGRATED CIRCUIT

(75) Inventors: Anil Kumar, Clifton Park, NY (US); Michael A. Nix, Austin, TX (US); Moises E. Robinson, Austin, TX (US); Carlin D. Cabler, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1105 days.

(21) Appl. No.: 13/339,444

(22) Filed: Dec. 29, 2011

(65) Prior Publication Data

US 2013/0170078 A1 Jul. 4, 2013

(51) Int. Cl.
*H02H 9/00* (2006.01)
*H02H 7/20* (2006.01)
*H02H 9/04* (2006.01)

(52) U.S. Cl.
CPC . *H02H 7/20* (2013.01); *H02H 9/041* (2013.01)

(58) Field of Classification Search
USPC ..................................................... 361/18, 56
See application file for complete search history.

(56) References Cited

U.S. PATENT DOCUMENTS

| | | | | |
|---|---|---|---|---|
| 2003/0043523 A1* | 3/2003 | Hung | .................... | H02H 9/046 361/111 |
| 2005/0013073 A1* | 1/2005 | Cheng | ................. | H01L 27/0255 361/56 |
| 2006/0274466 A1* | 12/2006 | Rice | .................... | H01L 27/0266 361/56 |
| 2009/0195951 A1* | 8/2009 | Sorgeloos | .............. | H02H 9/046 361/56 |
| 2009/0207544 A1* | 8/2009 | Boyko et al. | ................. | 361/91.1 |
| 2012/0257317 A1* | 10/2012 | Abou-Khalil et al. | .......... | 361/56 |

\* cited by examiner

*Primary Examiner* — Ronald W Leja
(74) *Attorney, Agent, or Firm* — Volpe and Koenig, P.C.

(57) ABSTRACT

A high voltage protection circuit for a non-tolerant integrated circuit is described herein. A non-tolerant integrated circuit may be a powered down integrated circuit or a low voltage tolerant integrated circuit, that may be exposed to a high voltage source such as an external circuit, device or power supply. The high voltage protection circuit includes a limiting transistor circuit, a control transistor circuit, and an isolation transistor circuit. The limiting transistor circuit limits or holds the voltage at the signal bump to be less than a voltage that can damage the circuit. The isolation transistor circuit disconnects input/output signal circuitry from normal protection circuitry. Both the limiting transistor circuit and the isolation transistor circuit are controlled by the control transistor circuit and are responsive to the power supply voltage being off.

19 Claims, 5 Drawing Sheets

US 9,312,686 B2

HIGH VOLTAGE PROTECTION CIRCUIT FOR NON-TOLERANT INTEGRATED CIRCUIT

FIELD OF INVENTION

The present invention is generally directed to integrated circuits, and in particular, to protection circuits for integrated circuits.

BACKGROUND

An integrated circuit may be connected to a power supply having a specified voltage level. For example, the voltage level of the power supply may be 3 volts. The integrated circuit may also be tolerant to the voltage level of the power supply. For example, when the power supply for the integrated circuit is on, being tolerant may mean that the integrated circuit is able to handle 3 volts without any impact on the transistors and related hardware. When the power supply for the integrated circuit is off, the signal bump for the integrated circuit may still be exposed to 3 volts as a result of an external circuit, device or another power supply. In this case, the transistors and related hardware of the integrated circuit may not be tolerant to the 3 volts and may be damaged. In another case, the integrated circuit may be tolerant to a 1 volt power supply but the signal bump may be exposed to a 3 volt source. In this case, the transistors and related hardware of the integrated circuit may also be damaged.

SUMMARY OF EMBODIMENTS OF THE INVENTION

A high voltage protection circuit for a non-tolerant integrated circuit is described herein. A non-tolerant integrated circuit may be a powered down integrated circuit or a low voltage tolerant integrated circuit, that may be exposed to a high voltage source such as an external circuit, device or power supply. The high voltage protection circuit includes a limiting transistor circuit, a control transistor circuit, and an isolation transistor circuit. The limiting transistor circuit limits the voltage at the signal bump to a voltage to be less than a voltage that can damage the circuit. The isolation transistor circuit disconnects input/output signal circuitry from normal protection circuitry. Both the limiting transistor circuit and the isolation transistor circuit are controlled by the control transistor circuit and are responsive to the power supply voltage being off.

BRIEF DESCRIPTION OF THE DRAWINGS

A more detailed understanding may be had from the following description, given by way of example in conjunction with the accompanying drawings, wherein.

DETAILED DESCRIPTION OF THE EMBODIMENTS

Figure 1:
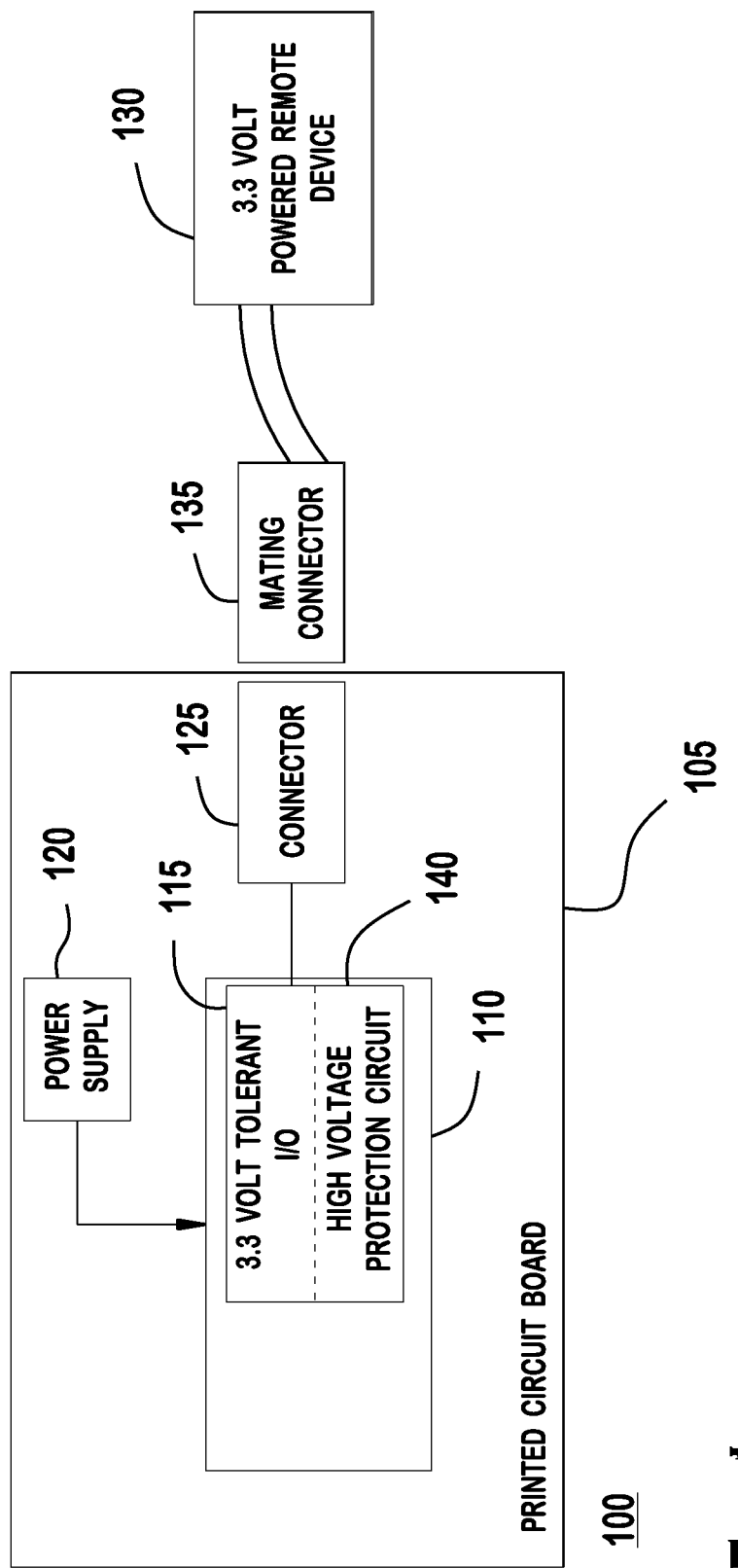
FIG. 1 is an example high level block diagram of a printed circuit board with a high voltage protection circuit.

FIG. 1 illustrates an example high level block diagram 100 of a printed circuit board 105 with a high voltage protection circuit 140. The printed circuit board 105 may include at least one integrated circuit 110 and an internal power supply 120 that may power the integrated circuit 110. Each integrated circuit 110 may have a specified voltage tolerant input/output circuit 115 that protects the integrated circuit 110 when the internal power supply 120 is on. For example, the specified voltage may be 3.3 volts. The printed circuit board 105 may also have a connector 125, which in turn may be connected to the voltage tolerant input/output circuit 115. A remote device 130 may include a mating connector 135 for connecting to the connector 125. The remote device 130 may be, for example, a 3.3 volt powered remote device. That is, the remote device has a voltage that may damage the integrated circuit 110. Although a printed circuit board is shown, any media capable of implementing or holding integrated circuits may be applicable. An integrated circuit may be a chip, microchip, electronic module and the like.

In the scenario where the integrated circuit 110 is powered by internal power supply 120, then the voltage tolerant input/output circuit 115 may be able to protect the integrated circuit 110 when the remote device 130 is connected via connector 125 and mating connector 135. In the scenario where the integrated circuit 110 in not being powered by the internal power supply 120 and a high voltage protection circuit 140 is not implemented (as discussed herein below), then the transistors and related hardware of integrated circuit 110 may be harmed or damaged when the remote device 130 is connected via connector 125 and mating connector 135. This damage may occur since the integrated circuit 110 is still connected to the connector 125 and may therefore be exposed to the remote device 130.

A high voltage protection circuit 140 may be provided to protect the integrated circuit 110 when the internal power supply 120 is off. The high voltage protection circuit 140 may include a limiting circuit, a control circuit, and an isolation circuit, (as described in detail with respect to FIGS. 2A and 2B herein below). The limiting circuit limits the voltage at the connector 125 to be less than a voltage that can damage input/output circuitry 115. As described herein below, the isolation circuit disconnects driver bias transistors from normal protection signal circuitry, where both the driver bias transistors and the normal protection signal circuitry are included in, or part of, input/output circuitry 115. Both the limiting circuit and the isolation circuit are controlled by the control circuit and are responsive to the power supply voltage being off. The high voltage protection circuit 140 may obtain power from the connector 125 or signal bump.

Figure 2A:
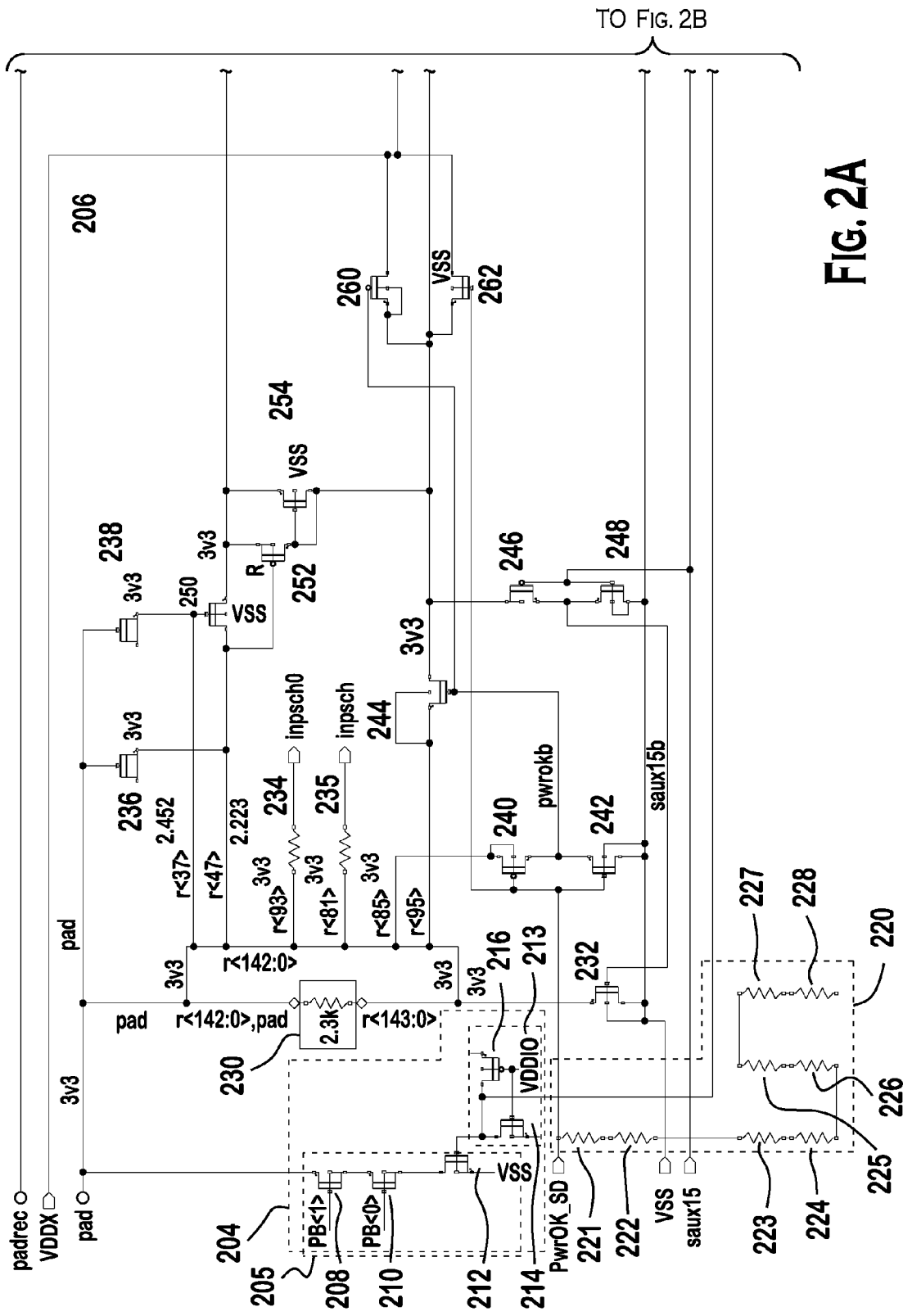
FIGS. 2A and 2B are an example block diagram of a high voltage protection circuit.
Figure 2B:
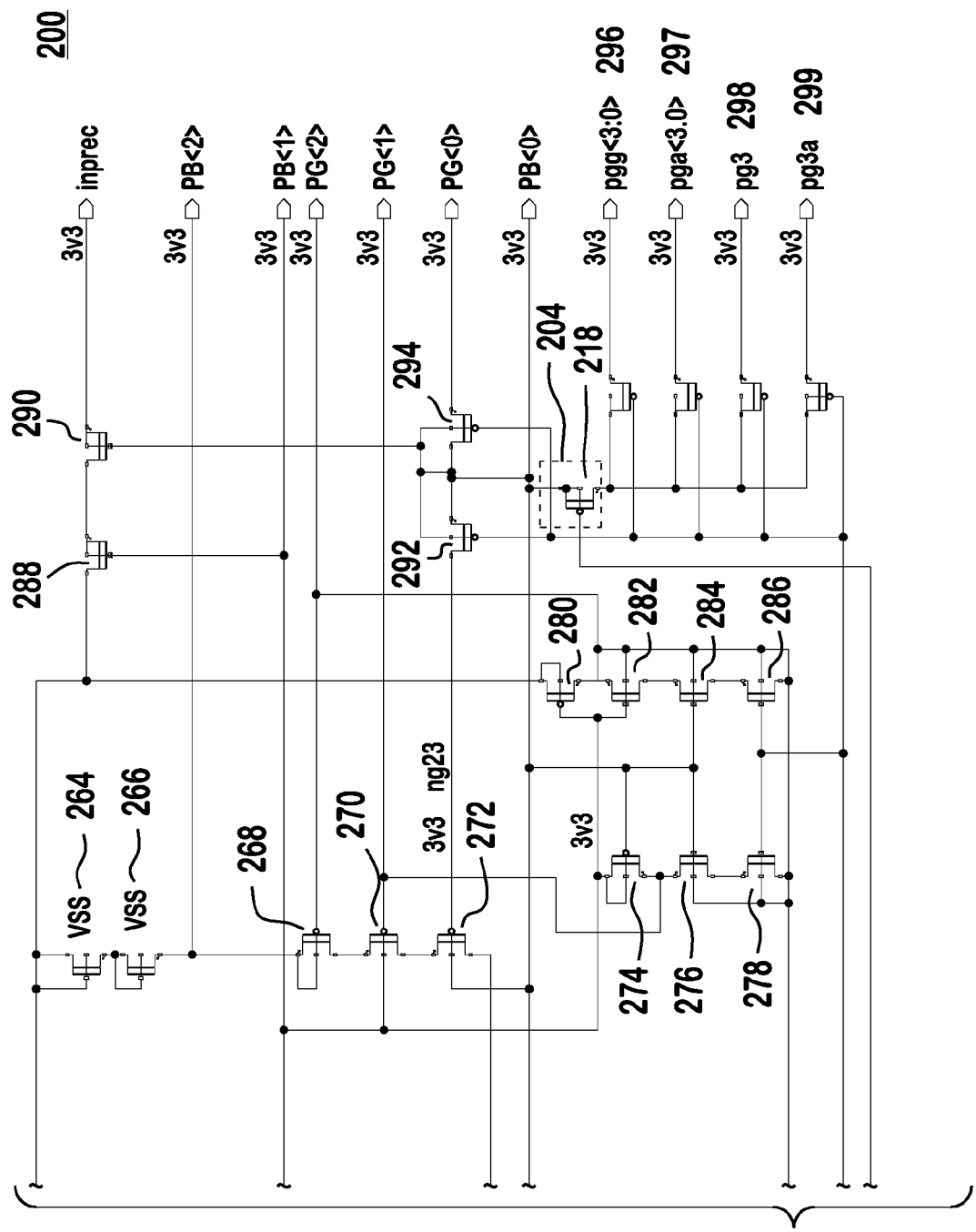

FIGS. 2A and 2B are an embodiment of a protection circuit 200 that may include a high voltage protection circuit 204 and a normal protection and gate biasing circuit ("normal protection circuit") 206. The protection circuit 200 may include an input from the signal bump which is denoted as "pad", a "padrec" input, a PwrOk_SD signal, a positive supply voltage or internal power supply (VDDIO), a negative power supply voltage (VSS), and a saux15 signal. The PwrOK_SD signal is a control signal that sets the default operation of the pad during a power-up sequence before all of the power supplies are stable. The saux15 signal is a control signal that sets the operational mode of the pad to either the low-voltage push-pull mode or the 3.3 volt tolerant pull down mode. Outputs from the high voltage protection circuit 200 may include protection voltages PB<0>, PB<1>, PB<2>, PG<0>, PG<1> and PG<2>, signals inpsch0 and inpsch and a set of four driver outputs denoted as "pgg", "pga", "pg3", and "pg3a". The signal "inprec" is an output of normal protection circuit

206. As stated above, "pad" is the input from the signal bump and the circuit(s) that is/are being protected is connected to the pad.

The high voltage protection circuit 204 may include a limiting circuit 205, a control circuit 213 and an isolation circuit 218, which are interconnected at a biasing node or via a biasing signal denoted as "netpass". The limiting circuit 205 may include an n-channel metal oxide semiconductor field-effect transistor (MOSFET) 208 having a source connected to the pad, a gate connected to PB<1> and a drain connected to a source of a n-channel MOSFET 210. A gate of the n-channel MOSFET 210 is connected to PB<0> and a drain is connected to a drain of a n-channel MOSFET 212, which has a source connected to VSS. The control circuit 213 may include a n-channel MOSFET 214 having a source connected to VSS and a gate connected to VDDIO. The control circuit 213 may also include a p-channel MOSFET 216 having a source connected to a resistor r<75> of resistor string 230 and a gate connected to VDDIO. The isolation circuit 218 is a p-channel MOSFET having a source connected to a drain of each of p-channel MOSFETs 296, 297, 298 and 299 (collectively the "driver bias transistors") and a drain connected to a PB<0> output signal. The gate of MOSFET 212, the drain of MOSFET 214, the drain of MOSFET 216 and the gate of MOSFET 218 are connected at a netpass biasing node or via a netpass biasing signal.

The normal protection circuit 206 may include a resistor string 220 and 230. The resistor string 220 may include serially connected resistors 223, 224, 225, 226, 227 and 228, where resistor 223 is connected to signal PwrOK_SD and resistor 228 is connected to VSS. Each of the resistors 223, 224, 225, 226, 227 and 228 in the resistor string 220 may be 8.695 kΩ or like value. The signal PwrOK_SD is connected to VSS or ground when VDDIO is off or low.

The resistor string 230 may include 144 serially connected resistors, where the first resistor is connected to the pad and the last resistor is connected to a source of a resistor string control transistor 232, where the drain of resistor string control transistor 232 is connected to VSS and the gate is connected to an inverted saux15 input signal (saux15b). The resistors may have, for example, a value of 2.5 kΩs. When the resistor string control transistor 232 is on, a current passes through the resistor string 230, (i.e., as a result of the voltage on the pad rising and falling), to produce numerous voltages that are fed or distributed to other parts of the protection circuit 200 to enable protection functionality and prevent oxide breakdown of the transistors. For example, see resistors r<37>, r<47> and r<95>.

The output signal inpsch0 is derived from a signal output at resistor r<90> and through a resistor 234 and signal inpsch is derived from a signal output at resistor r<81> and through a resistor 235. The "inpsch" and "inpsch0" are inputs to the data receivers. The tap position on resistor string 230 is chosen such that when the pad signal is at 3.3 volts, the receiver input is low enough to not damage the receiver's gate oxide.

The normal protection circuit 206 may include two n-channel MOSFETs 236 and 238 having gates connected to the pad. The source of MOSFET 236 is connected to an output of resistor r<47> and the source of MOSFET 238 is connected to an output of resistor r<37> and a gate of n-channel MOSFET 250. The two n-channel MOSFETs 236 and 238 are configured to act as capacitors to prevent high gate-to-source voltages on certain devices due to fast rise times on the pad. The MOSFET 250 has a drain connected to an output of resistor r<47> and a source connected to a drain of p-channel MOSFET 252 and a source of n-channel MOSFET 254. The node and/or signal determined by these interconnections are PB<1>. The gate of p-channel MOSFET 252 is connected to an output of resistor r<47> and a source of p-channel MOSFET 252 is connected to a gate of n-channel MOSFET 254. The node and/or signal determined by the latter connection is PB<0>.

The normal protection circuit 206 may include a p-channel MOSFET 240 having a drain connected to an output of resistor r<85>, a gate connected to PwrOK_SD and a source connected to a source of a n-channel MOSFET 242. The node and/or signal determined by the latter connection is pwrokb. A gate of MOSFET 242 is also connected to PwrOK_SD and a drain is connected to VSS. The pwrokb node and/or signal is also connected to a gate of a n-channel MOSFET 244 and a gate of a p-channel MOSFET 260. The source of the MOSFET 244 is connected to an output of resistor r<95> and a drain is connected to the PB<0> node and/or signal. A source of the MOSFET 260 is connected to the PB<0> node and/or signal and the drain is connected to VDDIO. The PwrOK_SD signal is also connected to a gate of n-channel MOSFET 262, which has a source connected to the PB<0> node and/or signal and a drain connected to VDDIO.

The PB<0> node and/or signal is further connected to a drain of p-channel MOSFET 246. The source of the MOSFET 246 and the source of a n-channel MOSFET 248 is connected to a saux15b node and/or signal. The gates of MOSFET 246 and 248 are connected to a saux15 input signal.

The padrec is connected to a gate and drain of a n-channel MOSFET 264 and the source is connected to a drain and gate of a n-channel MOSFET 266. The source of the MOSFET 266 is connected to a source of a p-channel MOSFET 268. The node and/or signal determined by the connection is PB<2>. The gate of MOSFET 268 is is connected to signal PG<2> and the drain is connected to a source of p-channel MOSFET 270. The gate of MOSFET 270 is connected to signal PG<1> and the drain is connected to a source of p-channel MOSFET 272. The drain of MOSFET 272 is connected to VDDIO and the gate is connected to a drain of a p-channel MOSFET 292. The gate of MOSFET 292 is connected to a gate of each of p-channel MOSFETs 296, 297, 298 and 299, which are all connected to the saux15 input. The source of MOSFET 292 is connected to a drain of a p-channel MOSFET 294, which has a gate connected to a gate of each of p-channel MOSFETs 296, 297, 298 and 299. The source of the MOSFET 294 is connected to signal PG<0>. The sources of each of p-channel MOSFETs 296, 297, 298 and 299 are connected to pgg pad, pga pad, pg3 pad and pg3a pad, respectively.

The padrec is also connected to a drain of a n-channel MOSFET 288, which has a gate connected to a signal PB<1> and a source connected to a drain of a re-channel MOSFET 290. The source of MOSFET 290 is connected to an inprec pad and the gate is connected to a signal PB<0>.

The padrec is also connected to a drain of a p-channel MOSFET 280, which has a gate connected to a gate of a n-channel MOSFET 282 and a source connected to a source of MOSFET 282. The drain of MOSFET 282 is connected to a source of a n-channel MOSFET 284, which has a drain connected to a source of a n-channel MOSFET 286. The drain of MOSFET 284 is connected to VSS. The gate of MOSFET 284 is connected to the gate of n-channel MOSFET 278, the gate interconnection being further connected to signal saux15. The gate of MOSFET 284 is connected to the gate of n-channel MOSFET 276, the gate interconnection being further connected to a signal PB<0>.

The drain of MOSFET 278 is connected to VSS and the source is connected to a drain of MOSFET 276. The source of MOSFET 276 is connected to a source of a p-channel MOS- FET 274, the source interconnection being connected to a signal PG<1>. The gate of MOSFET 274 is connected to a signal PB<0> and a drain is connected to signal PB<1>.

During normal operation, a power supply 120 may provide VDDIO to an integrated circuit 110. When VDDIO is on or high, the high voltage protection circuit 204 will be inactive and the normal protection circuit 206 may be active depending upon the mode of operation of protection circuit 200. The protection circuit 200 may operate in a push-pull driver mode or in a specified volt tolerant mode, where the specified voltage may be 3.3 volts.

Referring again to FIGS. 2A and 2B, when VDDIO is on or high, MOSFET 216 of control circuit 213 is turned off and MOSFET 214 is turned on. This configuration of the control circuit 213 keeps MOSFET 212 of limiting circuit 205 off and provides no path for pad through MOSFET 208 and 210 to VSS or ground. High voltage protection circuit 204 is effectively and/or operationally off. Since the netpass node and/or signal is zero or low in this configuration, the isolation circuit 218 is turned on and allows for normal push-pull driver mode operation or provides for operation of the normal protection circuit 206 when in the specified voltage tolerant mode.

In push-pull driver mode, the saux15 signal, PwrOK_SD signal and VDDIO are all high. In this configuration, high voltage protection circuit 204 and resistor string control transistor 232 are both off. In addition, the biasing signal and protection signal functionality of protection circuit 200 are off.

In specified volt tolerant mode, the saux15 signal is low, and the PwrOK_SD signal and VDDIO are both high. In this configuration, high voltage protection circuit 204 is off and resistor string control transistor 232 is on. In this configuration, PB<0> is equal to VDDIO via MOSFETs 242 and 244. Therefore, normal protection circuit 206 is functionally and/or operationally active or on.

The high voltage protection circuit 204 is active and applicable when VDDIO is off or low and the voltage on the pad is rising due to the presence of a high voltage external device 130. In this configuration, the saux15 signal, PwrOK_SD signal and VDDIO are all low or off. The signal PwrOK_SD is connected to VSS or ground through resistor string 220 when VDDIO is off or low. This set of values results in MOSFET 216 of control circuit 213 being turned on and MOSFET 214 being turned off. This allows the netpass node and/or signal to be equal to the voltage output from resistor r<75> of resistor string 230. The resistor r<75> may have a value of approximately 1.58 volts as the pad increases to and/or becomes 3.3 volts. As the netpass node and/or signal increases, MOSFET 212 is turned on.

In addition, the signal PB<0> becomes equal to the output voltage of resistor r<95> and signal PB<1> becomes equal to the output voltage of resistor r<47>. The signals PB<0> and PB<1> are nominally sent out to corresponding n-channel MOSFET drivers. With respect to signal PB<0>, as the voltage on the pad increases, the r<85> output voltage increases. The signal pwrokb becomes equal to the r<85> output voltage since MOSFET 240 is turned on and MOSFET 242 is turned off due to the signal PwrOK_SD. The signal pwrokb then turns on MOSFET 244, which provides a path for signal PB<0> to be equal to the r<95> output voltage. With respect to signal PB<1>, as the voltage on the pad increases, MOSFET 250 turns on via MOSFET 238, and signal PB<1> becomes equal to the output voltage of r<47>. Since both signals PB<0> and PB<1> are high, then MOSFETs 208 and 210 are turned on. As a result, the pad has a current path to VSS or ground via MOSFETs 208, 210 and 212, which will limit the voltage excursions as the pad voltage increases. Each of the MOSFETs 208, 210 and 212 are large, low impedance devices, which limits how high the pad voltage may increase, namely, the specified volt tolerance.

As the netpass node and/or signal increases, then the transistor of isolation circuit 218 turns off and disconnects the driver bias transistors (MOSFETs 296, 297, 298 and 299) from signal PB<0>. As a result, the corresponding signals "pgg", "pga", "pg3", and "pg3a", respectively, are not sent out to a primary p-channel MOSFET driver for the output pad, (i.e., the "pad" in FIGS. 2A and 2B). This occurs whenever the pad voltage rises above a certain value when VDDIO is down or off.

The disconnection counters the issue of signal PB<0> going to zero or being held low by the driver bias transistors. The above four signals are driven from two sources depending on whether it is in push-pull driver mode, (acting as an input/output cell), or in specified volt tolerant mode. In the specified volt tolerant mode, the primary p-channel driver has to be removed and the four signals have to be connected such that as the voltage at the pad increases or rises, the driver bias transistors are not destroyed. Since an assumption was that VDDIO is always on when an external 3.3 voltage device is applied to the integrated circuit, the specified volt tolerant mode may not be activated when VDDIO is off. Specifically, the logic driving the data into the p-channel driver can not be turned off to stop driving the data since the logic runs off of VDDIO. As the pad increases, signal PB<0> is also supposed to increase. However, the voltage level at signal PB<0>, which primarily drives gates of devices and does not have large current driving capabilities, is being held low by the connected driver bias transistors. This occurs because the signal PB<0> is trying to drive the logic that generates the four signals above.

The driver bias transistors are connected to another set of logic, (not shown), that is set to a high impedance state with transfer gates or switches when operating in a specified volt tolerant mode. However, the high impedance switches can not be set when VDDIO is low or off. As a result, the four signals go high and reverse biases the driver bias transistors' drain connections and dumps or unloads all the current into VDDIO, which is low or zero. Consequently, the driver bias transistors are isolated from the signal PB<0> when VDDIO is low or off and the pad is rising due to the external device.

A method for providing high voltage protection to a non-tolerant integrated circuit is described herein. In general, a high voltage protection circuit is connected to a pad that may be exposed to an external powered device. The high voltage protection circuit includes control inputs and may be activated in response to a power supply being off. In this event, the control inputs and the pad being exposed to the external powered device. The high voltage protection circuit includes a limiting circuit that limits the voltage at the pad due to the external powered device by providing the pad with a path to ground. The high voltage protection circuit also includes isolation circuitry that isolates driver circuitry from a protection circuit in response to activation of the high voltage protection circuit.

Figure 3:
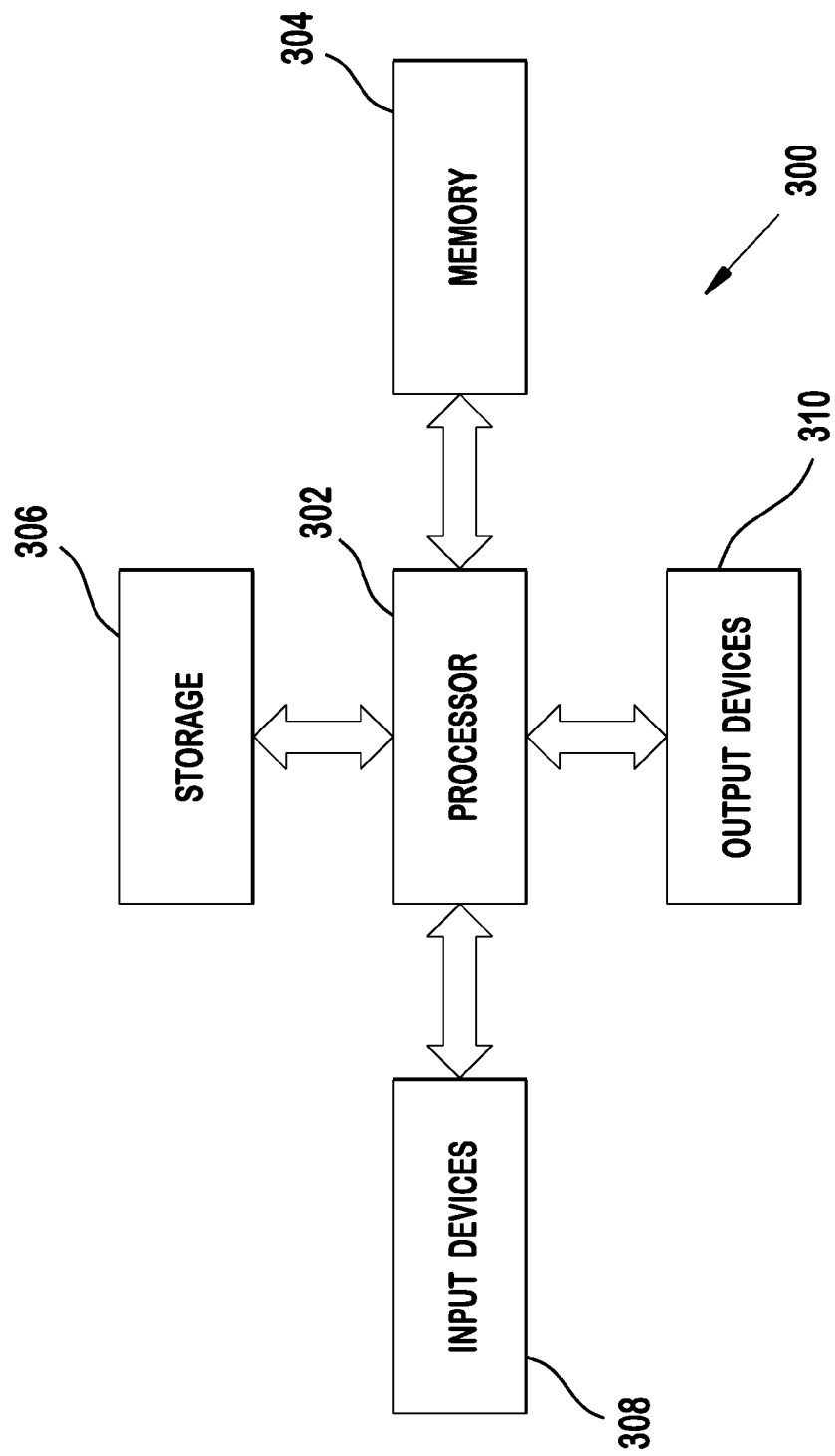
FIG. 3 is a block diagram of an example device in which one or more disclosed embodiments may be implemented.

FIG. 3 is a block diagram of an example device 300 in which one or more disclosed embodiments may be implemented. The device 300 may include, for example, a computer, a gaming device, a handheld device, a set-top box, a television, a mobile phone, or a tablet computer. The device 300 includes a processor 302, a memory 304, a storage 306, one or more input devices 308, and one or more output devices 310. It is understood that the device may include additional components not shown in FIG. 3.

The processor 302 may include a central processing unit (CPU), a graphics processing unit (GPU), a CPU and GPU located on the same die, one or more processor cores, wherein each processor core may be a CPU or a GPU. The memory 304 may be located on the same die as the processor 302, or may be located separately from the processor 304. The memory 304 may include a volatile or non-volatile memory, for example, random access memory (RAM), dynamic RAM, or a cache.

The storage 306 may include a fixed or removable storage, for example, hard disk drive, solid state drive, optical disk, or flash drive. The input devices 308 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 310 may include a display, a speaker, a printer, a haptic feedback device, one or more lights, an antenna, or a network connection (e.g., a wireless local area network card for transmission and/or reception of wireless IEEE 802 signals).

Figure 4:
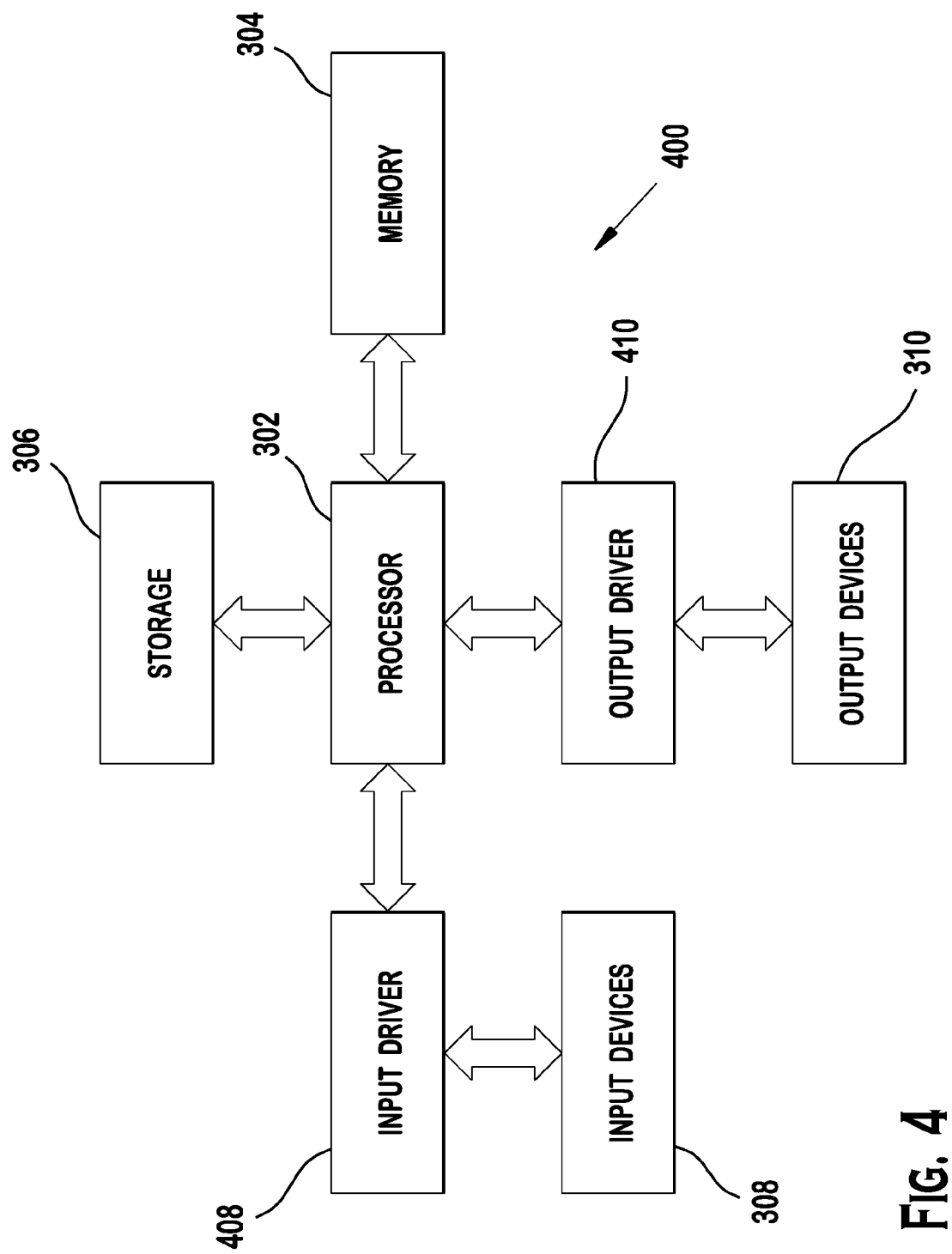
FIG. 4 is a block diagram of an alternate example device in which one or more disclosed embodiments may be implemented.

FIG. 4 is a block diagram of an alternate example device 400 in which one or more disclosed embodiments may be implemented. Elements of the device 400 which are the same as in the device 300 are given like reference numbers. In addition to the processor 302, the memory 304, the storage 306, the input devices 308, and the output devices 310, the device 400 also includes an input driver 408 and an output driver 410.

The input driver 408 communicates with the processor 302 and the input devices 308, and permits the processor 302 to receive input from the input devices 308. The output driver 410 communicates with the processor 302 and the output devices 310, and permits the processor 302 to send output to the output devices 310.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Although features and elements are described above in particular combinations, each feature or element may be used alone without the other features and elements or in various combinations with or without other features and elements. The methods provided may be implemented in a general purpose computer, a processor or any IC that utilizes power gating functionality. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. An integrated circuit, comprising:
    a pad exposable to an external powered device;
    a high voltage protection circuit connected to the pad and responsive to a power input and control inputs, the high voltage protection circuit including a first transistor responsive to the power input to activate a limiting circuit and a second transistor responsive to the power input to deactivate the limiting circuit;
    a biasing and protection circuit providing the control inputs to the high voltage protection circuit: and
    the high voltage protection circuit including an isolation circuit responsive to the power input and control inputs, wherein the isolation circuit disconnects driver circuitry from a protection circuit in the biasing and protection circuit,
    wherein the high voltage protection circuit limits the voltage at the pad due to the external powered device when the power input to the integrated circuit is low.

2. The integrated circuit of claim 1, wherein the high voltage protection circuit further comprises:
    a control circuit responsive to the power input and the control inputs; and
    the limiting circuit being responsive to the control inputs and the control circuit, wherein the limiting circuit provides the pad with a path to ground.

3. The integrated circuit of claim 2, wherein the limiting circuit further comprises:
    the first transistor connected to the pad and responsive to the control inputs;
    the second transistor connected in series with the first transistor and responsive to the control inputs; and
    a third transistor connected in series with the second transistor and connected to the control circuit.

4. The integrated circuit of claim 2, wherein the isolation circuit further comprises:
    a p-channel transistor responsive to the control circuit to isolate the driver circuitry from the protection circuit in the biasing and protection circuit.

5. The integrated circuit of claim 2, wherein the high voltage protection circuit further comprises:
    the first transistor connected to the pad and responsive to the control inputs;
    the second transistor connected in series with the first transistor and responsive to the control inputs;
    a third transistor connected in series with the second transistor;
    a fourth transistor responsive to the power input to activate the third transistor, wherein activation of the third transistor provides the path to ground; and,
    a fifth transistor responsive to the power input to not activate the third transistor.

6. A method for providing high voltage protection to a non-tolerant integrated circuit, comprising:
    connecting a high voltage protection circuit to a pad;

providing control inputs to the high voltage protection circuit;

activating the high voltage protection circuit in response to a power supply being off, the control inputs and the pad being exposed to an external powered device;

limiting the voltage at the pad due to the external powered device by providing a first transistor to activate a limiting circuit in response to activation of the high voltage protection circuit and a second transistor to deactivate a limiting circuit in response to deactivation of the high voltage protection circuit: and isolating driver circuitry from a protection circuit in response to activation of the high voltage protection circuit.

7. The method of claim 6, wherein the limiting circuit provides the pad with a path to ground in response to activation of the high voltage protection circuit.

8. The method of claim 6, wherein the first transistor is connected to the pad and responsive to the control inputs and the second transistor is connected in series with the first transistor and responsive to the control inputs, further comprising:

providing a third transistor connected with the second transistor;

providing a fourth transistor responsive to activation of the high voltage protection circuit to activate the third transistor, wherein activation of the third transistor provides the path to ground; and, providing a fifth transistor responsive to the power supply being on and not activating the third transistor.

9. A system including a printed circuit board, comprising:

a pad exposable to an external powered device;

a high voltage protection circuit connected to the pad and responsive to a power input and control inputs, the high voltage protection circuit including a first transistor responsive to the power input to activate a limiting circuit and a second transistor responsive to the power input to deactivate the limiting circuit;

a biasing and protection circuit providing the control inputs to the high voltage protection circuit: and the high voltage protection circuit including an isolation circuit responsive to the power input and control inputs, wherein the isolation circuit disconnects driver circuitry from a protection circuit in the biasing and protection circuit, wherein the high voltage protection circuit limits the voltage at the pad due to the external powered device when the power input to the integrated circuit is low.

10. The system of claim 9, wherein the high voltage protection circuit further comprises:

a control circuit responsive to the power input and the control inputs; and the limiting circuit being responsive to the control inputs and the control circuit, wherein the limiting circuit provides the pad with a path to ground.

11. The system of claim 10, wherein the limiting circuit further comprises:

the first transistor connected to the pad and responsive to the control inputs;

the second transistor connected in series with the first transistor and responsive to the control inputs; and a third transistor connected in series with the second transistor and connected to the control circuit.

12. The system of claim 10, wherein the isolation circuit further comprises:

a p-channel transistor responsive to the control circuit to isolate the driver circuitry from the protection circuit in the biasing and protection circuit.

13. The system of claim 10, wherein the high voltage protection circuit further comprises:

the first transistor connected to the pad and responsive to the control inputs;

the second transistor connected in series with the first transistor and responsive to the control inputs;

a third transistor connected in series with the second transistor;

a fourth transistor responsive to the power input to activate the third transistor, wherein activation of the third transistor provides the path to ground; and, a fifth transistor responsive to the power input to not activate the third transistor.

14. A non-transitory computer-readable storage medium configured to store a set of instructions used for manufacturing a device, wherein the device comprises:

a pad exposed to an external powered device;

a high voltage protection circuit connected to the pad and responsive to a power input and control inputs;

a biasing and protection circuit providing the control inputs to the high voltage protection circuit, the high voltage protection circuit limiting the voltage at the pad due to the external powered device when the power input to the integrated circuit is low: and the high voltage protection circuit including an isolation circuit responsive to the power input and control inputs, wherein the isolation circuit disconnects driver circuitry from a protection circuit in the biasing and protection circuit, wherein the high voltage protection circuit includes a first transistor responsive to the power input to activate a limiting circuit and a second transistor responsive to the power input to deactivate the limiting circuit.

15. The non-transitory computer-readable storage medium of claim 14, wherein the instructions are Verilog data instructions.

16. The non-transitory computer-readable storage medium of claim 14, wherein the instructions are hardware description language (HDL) instructions.

17. The non-transitory computer-readable storage medium of claim 14, wherein the high voltage protection circuit further comprises:

a control circuit responsive to the power input and the control inputs; and the limiting circuit being responsive to the control inputs and the control circuit, wherein the limiting circuit provides the pad with a path to ground.

18. The non-transitory computer-readable storage medium of claim 17, wherein the limiting circuit further comprises:

the first transistor connected to the pad and responsive to the control inputs;

the second transistor connected in series with the first transistor and responsive to the control inputs; and a third transistor connected in series with the second transistor and connected to the control circuit.

19. The non-transitory computer-readable storage medium of claim 17, wherein the isolation circuit further comprises:

a p-channel transistor responsive to the control circuit to isolate the driver circuitry from the protection circuit in the biasing and protection circuit.

* * * * *